(12) United States Patent
Hirai et al.

(10) Patent No.: US 10,752,732 B2
(45) Date of Patent: Aug. 25, 2020

(54) PURIFICATION METHOD OF POLYETHYLENE GLYCOL HAVING ONE CARBOXYL GROUP

(71) Applicant: NOF CORPORATION, Tokyo (JP)

(72) Inventors: Midori Hirai, Kawasaki (JP); Hiroki Yoshioka, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 16/498,248

(22) PCT Filed: Mar. 22, 2018

(86) PCT No.: PCT/JP2018/011472
§ 371 (c)(1),
(2) Date: Sep. 26, 2019

(87) PCT Pub. No.: WO2018/180907
PCT Pub. Date: Oct. 4, 2018

(65) Prior Publication Data
US 2020/0079905 A1     Mar. 12, 2020

(30) Foreign Application Priority Data
Mar. 30, 2017 (JP) .................................. 2017-066695

(51) Int. Cl.
*C08G 65/46* (2006.01)
(52) U.S. Cl.
CPC ...................... *C08G 65/46* (2013.01)
(58) Field of Classification Search
CPC ................... C08G 65/46; C08G 65/30
See application file for complete search history.

(56) References Cited

U.S. PATENT DOCUMENTS

| | | |
|---|---|---|
| 5,605,976 A | 2/1997 | Martinez et al. |
| 5,643,575 A | 7/1997 | Martinez et al. |
| 5,681,567 A | 10/1997 | Martinez et al. |
| 5,756,593 A | 5/1998 | Martinez et al. |
| 5,919,455 A | 7/1999 | Greenwald et al. |
| 5,932,462 A | 8/1999 | Harris et al. |
| 6,113,609 A | 9/2000 | Adams |
| 6,113,906 A | 9/2000 | Greenwald et al. |
| 2002/0052443 A1 | 5/2002 | Greenwald et al. |
| 2005/0036978 A1 | 2/2005 | Kozlowski |
| 2005/0058620 A1 | 3/2005 | Nakamoto et al. |
| 2005/0171291 A1 | 8/2005 | Kozlowski et al. |
| 2005/0288490 A1 | 12/2005 | Nakamoto et al. |
| 2006/0073113 A1 | 4/2006 | Nakamoto et al. |
| 2006/0115450 A1 | 6/2006 | Nakamoto et al. |
| 2009/0192320 A1 | 7/2009 | Nakamoto et al. |
| 2009/0264600 A1 | 10/2009 | Kozlowski |
| 2010/0004428 A1 | 1/2010 | Kozlowski et al. |
| 2010/0292515 A1 | 11/2010 | Yamamoto et al. |
| 2011/0082277 A1 | 4/2011 | Nakamoto et al. |
| 2012/0209027 A1 | 8/2012 | Kozlowski |
| 2013/0231490 A1 | 9/2013 | Kozlowski |
| 2014/0296541 A1 | 10/2014 | Kozlowski |
| 2016/0046762 A1 | 2/2016 | Yoshioka et al. |
| 2019/0055353 A1 | 2/2019 | Doi et al. |

FOREIGN PATENT DOCUMENTS

| | | |
|---|---|---|
| EP | 2 657 272 A1 | 10/2013 |
| JP | 9-504299 A | 4/1997 |
| JP | 2004-197077 A | 7/2004 |
| JP | 2011-79934 A | 4/2011 |
| JP | 4959133 B2 | 6/2012 |
| JP | 5015608 B2 | 8/2012 |
| JP | 2013-104039 A | 5/2013 |
| JP | 2014-59754 A | 4/2014 |
| JP | 2014-132077 A | 7/2014 |
| JP | 2014-208786 A | 11/2014 |
| JP | 5618248 B2 | 11/2014 |
| JP | 2017-95565 A | 6/2017 |
| WO | 2012/086016 A1 | 6/2018 |

OTHER PUBLICATIONS

International Search Report dated Jun. 26, 2018 issued by the International Searching Authority in counterpart International Application No. PCT/JP2018/011472 (PCT/ISA/210).
Written Opinion dated Jun. 26, 2018 issued by the International Searching Authority in counterpart International Application No. PCT/JP2018/011472 (PCT/ISA/237).
Johansson, "Effects of Poly(Ethylene Glycol)-Bound Alcohols and Amines on the Partition of Albumins and Thylakoid Membranes in an Aqueous Two-Phase System", Journal of Chromatography, 368, 1986, pp. 309-317, 9 pages total.

*Primary Examiner* — Rosalynd A Keys
(74) *Attorney, Agent, or Firm* — Sughrue Mion, PLLC

(57) ABSTRACT

A purification method of a polyethylene glycol compound having one carboxyl group. In the method, an aqueous solution of the compound having a pH of 8 to 11 is prepared, the aqueous solution and a mixed organic solvent are mixed at a temperature of 15° C. or more and 50° C. or less and the mixture is separated into an organic layer and an aqueous layer. In the mixed organic solvent, a ratio of solvent I is from 25 to 60% by mass, and a ratio of solvent II is from 75 to 40% by mass. Solvent I is a hydrocarbon, solvent II is a halogenated hydrocarbon, a mixing ratio Y (organic solvent I/organic solvent II), a temperature T (° C.) at mixing and a weight average molecular weight M of the compound satisfy a relationship of $3.11 \times 10^{-6} M + 0.084 \leq Y - 0.0135 T \leq -1.77 \times 10^{-6} M + 0.404$.

20 Claims, 6 Drawing Sheets

PURIFICATION METHOD OF POLYETHYLENE GLYCOL HAVING ONE CARBOXYL GROUP

CROSS REFERENCE TO RELATED APPLICATIONS

This application is a National Stage of International Application No. PCT/JP2018/011472, filed Mar. 22, 2018, claiming priority based on Japanese Patent Application No. 2017-066695, filed Mar. 30, 2017, incorporated herein by reference in its entirety.

TECHNICAL FIELD

The present invention relates to a purification method of a polyethylene glycol compound having one carboxyl group for use in medical applications. More particularly, the invention relates to a purification method for obtaining a highly pure polyethylene glycol compound having one carboxyl group, which is an activated polyethylene glycol for chemical modification uses in a drug delivery system and is used as a raw material thereof.

The invention is particularly suitable for medical applications including modification of polypeptides, enzymes, antibodies, and other low molecular drugs, nucleic acid compounds including genes, oligo nucleic acids and the like, nucleic acid drugs and other physiologically active substances or applications to drug delivery system carriers, for example, liposomes, polymer micelles or nano-particles.

BACKGROUND ART

Polyethylene glycol (PEG) is widely known as a standard carrier in the drug delivery system and the development is being vigorously advanced even now. By modifying a physiologically active substance or a drug, for example, a liposome with polyethylene glycol, due to the high hydration layer and steric repulsion effect of polyethylene glycol, capture by the reticuloendothelial system (RES) or excretion in the kidney of the drug is suppressed and it is possible to improve the circulation in blood and to decrease the antigenicity. Among them, polyethylene glycol having a carboxyl group at the terminal is a particularly important material because it is used as a raw material for converting into an activated ester to form a stable amide bond with a lysine residue or a primary amino group at the N-terminal of a protein or other active groups. As a PEGylated preparation using polyethylene glycol having a carboxyl group as a raw material, SOMAVERT (registered trademark): PEGVISOMANT (Pfizer), Mircera (registered trademark): Methoxy Polyethylene glycol-epoetin beta (F Hoffmann-La Roche), Macugen (registered trademark): Pegaptanib (Eyetech) and the like are being placed on the market. In addition, clinical trials of many other PEGylated preparations are conducted, so that its utility is demonstrated.

As to the activated polyethylene glycol for the purpose of the medical applications, it has been demanded to reduce impurities from the standpoint of performance and safety of a drug produced by modifying the same. At present, as to the polyethylene glycol compound having a carboxyl group, those having various backbones and linkers between a carboxyl group and a polyethylene glycol have been developed and various impurities are by-produced according to the production methods thereof. Examples thereof are shown below.

As to a production method of a straight-chain polyethylene glycol having a carboxyl group, there have been reported a method of oxidizing a terminal hydroxyl group of polyethylene glycol with a heavy metal reagent described in Non Patent Literature 1, a method in which a terminal hydroxyl group of polyethylene glycol and an acrylic acid ester compound are bonded by Michael reaction and then ester hydrolysis is performed described in Patent Literature 1, a method in which a terminal hydroxyl group of polyethylene glycol and an ortho ester compound having a leaving group are bonded by Williamson reaction and then hydrolysis is performed described in Patent Literature 2, and the like.

Further, as to a branched polyethylene glycol having one carboxyl group, a method in which methoxypolyethylene glycol is introduced into two amino groups of lysine ethyl ester and then hydrolysis of the ester is performed and the like is reported in Patent Literature 3.

However, the conversion rate to a carboxyl group at the terminal of polyethylene glycol is not high in any of the production methods described above, and in the highest a carboxylic acid purity is around 90%. In the case where a drug is modified in this state, many impurities, for example, an unreacted drug or an unreacted or deactivated polyethylene glycol compound are contained in addition to the intended PEGylated preparation. Purification of the PEGylated preparation causes a technical problem in that separation is difficult and a problem in that the production cost is increased due to the decrease in drug yield. Thus, it is desirable to remove the polyethylene glycol compounds as impurities as much as possible before the bonding to the drug.

In the case where impurities, for example, a low-molecular compound or a salt are removed from a polymer compound, for example, polyethylene glycol, purification by crystallization and extraction operation utilizing physicochemical properties caused by a molecular weight, in particular, a large difference in solubility to a solvent is commonly performed. On the other hand, in the case where the polyethylene glycol compound as an impurity is present, a large difference in the physicochemical properties, for example, solubility, between the impurity and the polyethylene glycol compound of the objective substance does not appear. Therefore, it is difficult to remove the polyethylene glycol compound having no carboxyl group from the polyethylene glycol compound having one carboxyl group by a conventional operation for removing low-molecular impurities and to perform purification.

As to a purification method of a polyethylene glycol compound having a carboxyl group, column purification by an ion-exchange resin is performed by using the polarity thereof, and purification of a branched polyethylene glycol is described in Patent Literature 4. However, the concentration of the polyethylene glycol compound in the process must be in a high dilution condition of approximately from 0.1 to 2% in order to suppress lowering of the separation ability, and a large-capacity extraction facility or a concentration facility for recovering the polyethylene glycol compound in the aqueous solution is required after the fractionation, so that industrial productivity cannot be sufficiently satisfied. Moreover, since a large amount of the ion-exchange resin is finally discharged as a waste, the purification method has an industrial problem.

Further, a method of purification in which polyethylene glycol having a carboxyl group dissolved in an organic solvent is physically adsorbed to inorganic adsorbent and then desorbed using an alcoholic solvent is described in Patent Literature 5. However, in the purification method, the desorption reaction is insufficient and the yield is low as from 50 to 60%. Moreover, since a large amount of the adsorbent is finally discharged as a waste, the purification method has an industrial problem.

On the other hand, a method of purification in which a polyethylene glycol compound having an amino group is dissolved in a strongly acidic aqueous solution having a pH of 1 to 3 to ionize a terminal amino group and extracted in a specific temperature range using a specific mixed organic solvent is described in Patent Literature 6. According to the patent, the polyethylene glycol compound having an amino group whose hydrophilicity is increased by the ionization is distributed into an aqueous layer and a polyethylene glycol compound having no amino group is distributed into a mixed organic layer, so that selective separation and purification can be performed.

PRIOR ART LITERATURE

Non Patent Literature

Non Patent Literature 1: J. Chromatography A 1986, 368, 309-317

PATENT LITERATURE

Patent Literature 1: Japanese Patent No. 5015608
Patent Literature 2: Japanese Patent No. 4959133
Patent Literature 3: U.S. Pat. No. 6,113,609
Patent Literature 4: U.S. Pat. No. 5,932,462
Patent Literature 5: Japanese Patent No. 5618248
Patent Literature 6: JP-A-2014-059754
Patent Literature 7: JP-A-2004-197077
Patent Literature 8: JP-T-9-504299

SUMMARY OF INVENTION

Problem to be Solved by the Invention

However, in Patent Literature 6, there is no description on purification of a polyethylene glycol compound having a carboxyl group. Further, since the polyethylene glycol compound having a carboxyl group cannot be ionized by the purification method, it is difficult to perform selective separation and purification.

Moreover, even if ionization of a carboxyl group is attempted, although a carboxyl group and an amino group are both polar groups, their solubilities in water are different. For example, as to n-butylamine (n-$C_4H_{10}NH_2$) and valeric acid (n-$C_4H_{10}COOH$) each having the same alkyl chain length, the octanol/water distribution coefficient Log Pow of n-butyl amine is 0.86 and that of valeric acid is 1.39. Log Pow is a value of an index of lipophilicity/hydrophilicity, and valeric acid is easily transferred to an octanol side by about three times in a molar concentration then n-butylamine, that is, it is shown that the lipophilicity of carboxyl group is high. Thus, in the case where a polyethylene glycol compound having a carboxyl group is ionized in an alkaline aqueous solution, since the solubilities in a mixed organic solvent and water are different when the carboxyl group and the amino group are ionized, the mixing ratio of organic solvents and the specific temperature range optimized for purifying polyethylene glycol having an amino group cannot be applied.

As described above, in spite that the polyethylene glycol compound having a carboxyl group is an important material in medical applications, it is not obtained by an industrially easy production method and a number of problems exist.

An object of the invention is to purify efficiently and in a good purity a polyethylene glycol compound having one carboxyl group by an industrially feasible method.

Means for Solving the Problem

As a result of the intensive investigations to solve the problem described above, the inventors have found that a method of purification in which a polyethylene glycol compound having one carboxyl group is ionized in an alkaline aqueous solution having a specific pH range, and extraction operation is performed within a specific temperature range in a system composed of two or more kinds of organic solvents mixed at a specific ratio and an alkaline aqueous solution having a specific pH range.

A feature of the invention resides in being industrially feasible because the method of the invention is realizable by controlling a mixing ratio of a specific hydrocarbon solvent and a halogenated hydrocarbon solvent and an extraction temperature in appropriate ranges in a specific pH range, and can be performed even on a large scale without using a large amount of a carrier/adsorbent, for example, a resin or a gel, an ultrafiltration membrane, or the like.

Thus, the present invention is as follows.

(1) A purification method of a polyethylene glycol compound having one carboxyl group in which a total average molar number of ethylene oxide units added in its molecule is from 20 to 1490, the method comprising step (A), step (B) and step (C) shown below:

(A) a step of preparing an aqueous solution of the polyethylene glycol compound, which is a weakly alkaline aqueous solution having a pH of 8 to 11;

(B) an extraction step in which the aqueous solution obtained in the step (A) and a mixed organic solvent are mixed at a temperature of 15° C. or more and 50° C. or less and the mixture is separated into an organic layer and an aqueous layer, wherein in the mixed organic solvent, a ratio of an organic solvent I is from 25 to 60% by mass, a ratio of an organic solvent II is from 75 to 40% by mass, the organic solvent I is a hydrocarbon solvent selected from the group consisting of toluene, xylene, methyl acetate, ethyl acetate and butyl acetate, the organic solvent II is a halogenated hydrocarbon solvent selected from the group consisting of methylene chloride and chloroform, and a mixing ratio Y of the organic solvent I to the organic solvent II (organic solvent I/organic solvent II), a temperature T (° C.) at the time of the mixing and a weight average molecular weight M of the polyethylene glycol compound satisfy a relationship of formula (1):

$$3.11\times10^{-6}M+0.084 \leq Y-0.0135T \leq -1.77\times10^{-6}M+0.404 \quad (1);$$

and (C) a step of recovering the polyethylene glycol compound from the aqueous layer.

(2) The method of (1), wherein in the step (B), the mixing ratio Y of the organic solvent I to the organic solvent II (organic solvent I/organic solvent II), the temperature T (° C.) at the time of the mixing and the weight average molecular weight M of the polyethylene glycol compound satisfy a relationship of formula (2):

$$2.03\times10^{-6}M+0.175 \leq Y-0.0135T \leq -1.77\times10^{-6}M+0.404 \quad (2)$$

(3) The method of (1) or (2), wherein the extraction step (B) is performed a plurality of times for the aqueous layer separated in the step (B).

(4) The method of any one of (1) to (3), wherein in the step (A), the weakly alkaline aqueous solution contains a buffer.

(5) The method of (4), wherein in the step (A), the buffer is one or more salts selected from the group consisting of an organic salt and an inorganic salt of one or more elements selected from the group consisting of sodium, potassium, lithium and ammonium.

(6) The method of any one of (1) to (5), wherein in the step (B), the organic solvent I contains toluene.

The method of any one of (1) to (6), wherein in the step (B), the organic solvent II contains chloroform.

Effect of the Invention

The invention relates to a novel purification method for obtaining a polyethylene glycol compound having one carboxyl group of high purity for the purpose of medical applications. The purification method can separate a polyethylene glycol compound having no carboxyl group, which is difficult to be separated by conventional techniques. Further, even in the case where a polyethylene glycol compound includes a hydrolyzable linker, for example, an amide bond or a carbamate bond, decomposition of the bond is hard to occur and the deterioration of the quality can be prevented. Moreover, the purification method can be industrially performed easily, is excellent in productivity, and can be performed in a high yield in a process in which a waste, for example, an adsorbent or an ion-exchange resin is not generated.

EMBODIMENTS FOR CARRYING OUT THE INVENTION

Figure 1:
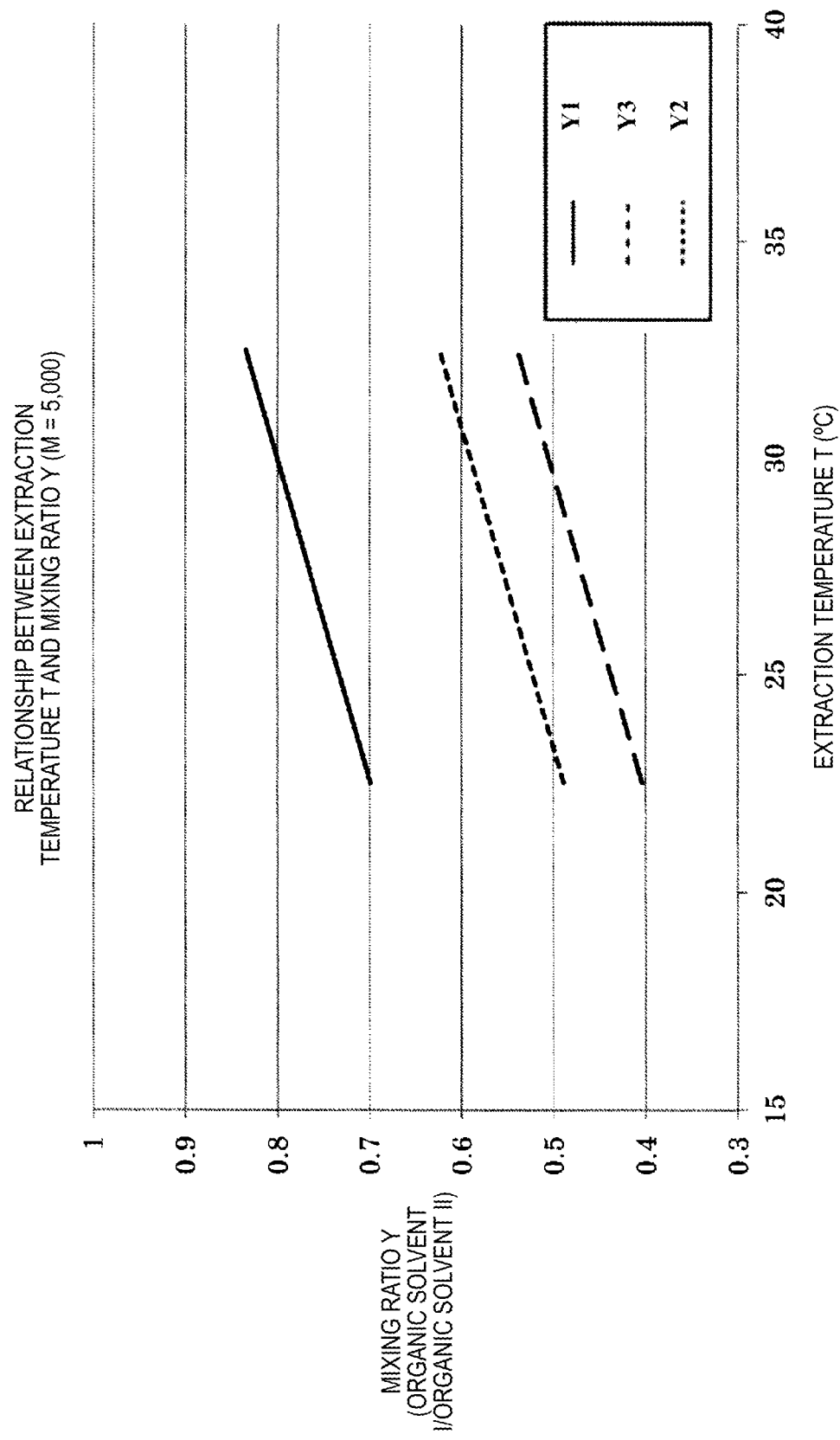
FIG. 1 is a graph showing a relationship between the mixing ratio of the solvents Y and the extraction temperature T in the case where a weight average molecular weight of the polyethylene glycol compound is 5,000.

The polyethylene glycol compound having one carboxyl group of the invention means a compound having one carboxyl group capable of being reacted with other molecule in a polyethylene glycol molecule.

In the polyethylene glycol compound having one carboxyl group of the invention, the total average molar number of the ethylene oxide units added in the molecule is 20 or more, preferably 40 or more, and more preferably 110 or more. Further, the total average molar number of the ethylene oxide units added in the molecule of the polyethylene glycol compound is 1,490 or less, and preferably 1,370 or less.

The weight average molecular weight of the polyethylene glycol compound having one carboxyl group of the invention is preferably 1,000 or more, more preferably 2,000 or more, and still more preferably 5,000 or more. Further, the weight average molecular weight of the polyethylene glycol compound is preferably 65573 or less, and more preferably 60263 or less.

The polyethylene glycol compound having one carboxyl group of the invention has a straight-chain or branched structure. The branched structure is preferably a glycerol backbone, a lysine backbone, a pentaerythritol backbone or a xylitol backbone, and more preferably a glycerol backbone or a lysine backbone. These compounds are obtained, for example, through a step of polymerizing ethylene oxide from a monovalent or polyvalent starting material having hydroxyl group(s) and a subsequent activation step as described in Patent Literature 7 (JP-A-2004-197077) or are obtained typically through a coupling reaction of two or more straight-chain polyethylene glycols and an activation step as described in Patent Literature 8 (JP-T-9-504299).

The polyethylene glycol compound which can be purified in the invention is that having only one carboxyl group in the structure. The functional group bonded to the terminal of the polyethylene glycol chain other than the carboxyl group is a hydrocarbon group having from 1 to 7 carbon atoms, a reactive functional group stable in a weakly alkaline aqueous solution or a protecting group of a functional group. The hydrocarbon group having from 1 to 7 carbon atoms include, for example, an alkyl group, for example, a methyl group, an ethyl group, a propyl group, an isopropyl group, a butyl group, an isobutyl group, a sec-butyl group, a tert-butyl, a pentyl group, an isopentyl group, a hexyl group, an isohexyl group, a heptyl group or an isoheptyl group, a phenyl group, and a benzyl group. The hydrocarbon group is preferably a methyl group, an ethyl group, a tert-butyl group or a benzyl group, and more preferably a methyl group. The reactive functional group stable in a weakly alkaline aqueous solution is preferably an amino group, an oxyamino group, a hydroxyl group, a thiol group, a cyano group or an azide group. The protective group of a functional group is preferably that being stable in a weakly alkaline aqueous solution of protecting groups of an amino group, a carboxyl group, a hydroxyl group, a thiol group, a hydrazine group, a hydrazide group and an oxyamine group.

(Step (A))

The step (A) is a step of preparing an aqueous solution of the polyethylene glycol compound having one carboxyl group, which is a weakly alkaline aqueous solution having a pH of 8 to 11.

The pH of the weakly alkaline aqueous solution is set to be from 8 to 11, preferably from 8 to 10, because when it is low, the ionization of the carboxyl group is insufficient and thus the hydrophilicity of the polyethylene glycol compound cannot be increased and when it is high, in the case where the polyethylene glycol compound includes a hydrolyzable linker, for example, an amide bond or a carbamate bond, decomposition of the bond is liable to occur.

The weakly alkaline aqueous solution may contain a buffer in order to mitigate the fluctuation of pH. As the buffer, an organic salt or inorganic salt exhibiting a buffering property, which is usually used in order to maintain the pH of 8 to 11, can be used. Specifically, the buffer includes an organic salt or an inorganic salt, for example, a phosphate, an acetate, a carbonate, a bicarbonate, a borate, a citrate, a phthalate, a tartrate or a lactate composed of sodium, potassium, lithium or ammonium. Further, a plurality of the organic salts and the inorganic salts may be used in combination.

The concentration of the buffer is not particularly limited as long as it is sufficient to maintain the solution of the invention at the desired pH of 8 to 11. When it is low, the buffering action is not exhibited, and when it is high, the solubility of the polyethylene glycol compound in water is decreased and the objective substance is easily distributed into the organic layer side, so that the yield is liable to decrease. Therefore, the concentration is preferably from 10 to 500 mM, more preferably from 25 to 300 mM, to the total amount of the aqueous solution of the invention.

The mass of the weakly alkaline aqueous solution used is preferably from 1 to 50 times by mass of the polyethylene glycol compound, more preferably from 2 to 20 times by mass of the polyethylene glycol compound, and particularly preferably from 5 to 20 times by mass of the polyethylene glycol compound.

(Step (B))

The step (B) is a step of mixing an organic solvent and the weakly alkaline aqueous solution containing the polyethylene glycol compound having one carboxyl group dissolved therein by stirring, shaking or the like, and allowing the mixture to stand for a certain period of time to cause layer separation into an organic layer and an aqueous layer. In the extraction step, the polyethylene glycol compound having one carboxyl group is preferably dissolved in the weakly alkaline aqueous solution in advance, since there is a high possibility that the separation of impurities and recovery of the objective substance becomes impossible due to emulsification when the polyethylene glycol compound having one carboxyl group in the state where it is previously dissolved in the organic solvent is mixed with the weakly alkaline aqueous solution.

The time for mixing and layer separation during the step is not particularly limited and is preferably between 1 minute to 12 hours, and more preferably from 10 minutes to 3 hours. Further, the atmosphere for performing the extraction operation is not particularly limited and the operation can be preferably performed in the presence of an inert gas, for example, nitrogen, for the purpose of minimizing oxidation. Moreover, an apparatus is also not particularly limited and, in consideration of the operation under nitrogen and in a sealed state for less occurrence of oxidative degradation, the operation can be also performed in a pressure vessel.

The organic solvent I to be used is a hydrocarbon solvent selected from toluene, xylene, methyl acetate, ethyl acetate and butyl acetate, and is preferably toluene or ethyl acetate, and more preferably toluene.

The organic solvent II to be used is a halogenated hydrocarbon solvent selected from methylene chloride and chloroform, and is preferably chloroform.

A common polyethylene glycol compound to be used shows characteristic solubility and the solubility is as follows: organic solvent II>water>organic solvent I. On the other hand, a polyethylene glycol compound having an ionized carboxyl group has hydrophilicity slightly higher than that of a polyethylene glycol compound having no carboxyl group. Therefore, when an organic solvent in which an appropriate amount of the organic solvent II is mixed with the organic solvent I is used, the solubility of the polyethylene glycol compound having a carboxyl group becomes as follows: water>(organic solvent I+organic solvent II) and the solubility of the polyethylene glycol compound having no carboxyl group becomes as follows: (organic solvent I+organic solvent II)>water. That is, since the polyethylene glycol compound having a carboxyl group is distributed into an aqueous layer and the polyethylene glycol compound having no carboxyl group is distributed into an organic layer, selective separation and purification can be performed.

The organic solvent to be used is a mixed solution having a mixing ratio of the organic solvent I: from 25 to 60% by mass and the organic solvent II: from 75 to 40% by mass. Since the specific gravity of the organic solvent I is smaller than 1 and the specific gravity of the organic solvent II is larger than 1, when the ratio of the organic solvent I increases, the specific gravity of the mixed solvent approaches to the specific gravity of the aqueous solution and hence layer separation ability tends to deteriorate. Therefore, a mixed solution having a mixing ratio of the organic solvent I: from 25 to 50% by mass and the organic solvent II: from 75 to 50% by mass is preferred.

As shown in the examples described hereinafter, when the mixing ratio of the organic solvent I to the organic solvent II (organic solvent I/organic solvent II) is taken as Y, the temperature in the step (B) is taken as T (° C.), and the weight average molecular weight of the polyethylene glycol compound is taken as M, purification is possible in the range where the relationship of formula (1) shown below is satisfied. Thereby, the inventors have first succeeded in providing a purification method capable of industrial separation of the highly pure polyethylene glycol compound described above.

$$3.11\times10^{-6}M+0.084 \leq Y-0.0135T \leq -1.77\times10^{-6}M+0.404 \quad (1)$$

The mass of the organic solvent I and the mass of the organic solvent II to be used are preferably each from 1 to 50 times by mass of the polyethylene glycol compound, more preferably each from 2 to 20 times by mass of the polyethylene glycol compound, and particularly preferably each from 5 to 20 times by mass of the polyethylene glycol compound.

The temperature at which the extraction operation is performed is preferably 50° C. or less, more preferably 45° C. or less, and still more preferably 35° C. or less, because when the temperature becomes high, due to volatilization of the organic solvent the mixing ratio of the solvent changes and change in the solubility of the polyethylene glycol compound is liable to occur. Further, the temperature at which the extraction operation is performed is preferably 10° C. or more, more preferably 15° C. or more, and still more preferably 20° C. or more, because when the temperature becomes low, the viscosity of the polyethylene glycol increases.

(Step (C))

The step (C) is a method of recovering the polyethylene glycol compound having one carboxyl group from the aqueous layer after the extraction.

The weakly alkaline aqueous solution containing the polyethylene glycol compound having one carboxyl group is made neutral or acidic with an acid. Thereafter, through the extraction into the organic layer, the polyethylene glycol compound having one carboxyl group is recovered by a step including any of concentration, crystallization, drying and the like.

EXAMPLES

The invention will be described more specifically with reference to the examples.

The polyethylene glycol impurities having no carboxyl group to be separated and removed in the examples are impurities having approximately the same weight average molecular weight as that of the polyethylene glycol compound having one carboxyl group. For the analysis of the polyethylene glycol compound, GPC and HPLC were used. The carboxylic acid yield described in the examples means (mass (g) after purification×carboxylic acid purity (%) after purification)÷(mass (g) of raw material×carboxylic acid purity (%) of raw material)×100.

The molecular weight of the polyethylene glycol compound was measured using LC-10Avp (Shimadzu) as a GPC system under the conditions described below.
GPC apparatus: LC-10Avp (Shimadzu)
Mobil phase: DMF (10 mM LiBr)
Flow rate: 0.7 mL/min
Column: PL gel MIXED-D (Polymer Laboratory)
Column temperature: 65° C.
Detector: RI
Injection quantity: 30 mg/30 mL (100 μL)

A calibration curve was formed using the polyethylene glycol compound as a standard substance.

The carboxylic acid purity of the polyethylene glycol compound was measured using alliance (Waters) as a HPLC system under the conditions described below.
HPLC apparatus: alliance (Waters)
Mobile phase: ammonium formate buffer solution (solvent: water, pH: 8.0)
Flow rate: 1.0 mL/minute
Column: anion-exchange column ES-502N (Asahipak)
Column temperature: 30° C.
Detector: RI
Injection quantity: 10 mg/mL (20 μL)

Since a polyethylene glycol compound having one carboxyl group ionized in the weakly alkaline aqueous solution mainly remains in the aqueous layer at the time of extraction and a polyethylene glycol compound having no carboxyl group tends to migrate to the organic layer, purification becomes possible. However, the purification cannot be achieved unless the extraction is performed at appropriate mixing ratio of the solvents and extraction temperature.

First, a mixing ratio Y of the solvents at which a polyethylene glycol compound begins to be obtained from the organic layer is taken as Y1. Y1 is an index of the mixing ratio at which purification becomes possible by the extraction method of the invention. That is, it is a point at which a polyethylene glycol compound having no carboxyl group, which is an impurity, begins to be preferentially distributed into the organic layer. In the case where the mixing ratio Y of the solvents is larger than Y1, the polyethylene glycol compound having no carboxyl group cannot be distributed into the organic layer and removed, so that the purification cannot be performed.

Next, when the extraction is performed at the mixing ratio Y of the solvents, which is lower than Y1, the mass of the polyethylene glycol compound having no carboxyl group obtained from the organic layer increases, but the polyethylene glycol compound having one carboxyl group also begins to be distributed into the organic layer from a certain mixing ratio. Then, the mixing ratio Y at which the mass of the polyethylene glycol compound having one carboxyl group contained in a concentrate obtained by concentrating the organic layer becomes 20% by mass is taken as Y2. Y2 is an index of the mixing ratio relating to the carboxylic acid yield by the extraction, and is a lower limit at which efficient purification is possible. In the case where the mixing ratio Y of the solvents is smaller than Y2, the polyethylene glycol compound having one carboxyl group, which is the objective substance, is distributed into the organic layer and removed together with the polyethylene glycol compound having no carboxyl group, so that the carboxylic acid yield of the polyethylene glycol compound having one carboxyl group after the purification decreases.

The carboxylic acid yield in the case where the mixing ratio Y is Y2 is more specifically explained. Assuming that when extraction is performed using 100 g of a polyethylene glycol compound having a carboxylic acid purity of 90% and the organic layer is concentrated, 10 g of a concentrate is obtained. The mass of the polyethylene glycol compound having one carboxyl group corresponding to 20% of the concentrate is as follows: 10 g×20%÷100=2 g. A decrease in the carboxylic acid yield is as follows: 2 g÷(100 g×90%÷100)×100=2.2%.

The relationship between Y1 and Y2 is always Y1>Y2.

Therefore, when the mixing ratio Y of the solvents is between Y1 and Y2 (Y1>Y>Y2), it is meant that the polyethylene glycol compound having one carboxyl group can be purified by extraction with industrially utilizable efficiency.

Moreover, the mixing ratio Y at which the polyethylene glycol compound having one carboxyl group contained in a polyethylene glycol compound obtained by concentrating the organic layer is 5% by mass is taken as Y3. Y3 is a preferred lower limit at which efficient purification is possible because the loss of the polyethylene glycol compound having a carboxyl group in the organic layer is less than that at Y2.

The carboxylic acid yield in the case where the mixing ratio Y is Y3 is more specifically explained. Assuming that when extraction is performed using 100 g of a polyethylene glycol compound having a carboxylic acid purity of 90% and the organic layer is concentrated, 10 g of a concentrate is obtained. The mass of the polyethylene glycol compound having one carboxyl group corresponding to 5% of the concentrate is as follows: 10 g×5%÷100=0.5 g. A decrease in the carboxylic acid yield is as follows: 0.5 g÷(100 g×90%÷100)×100=0.55%.

The relationship between Y1, Y2 and Y3 is always Y1>Y3>Y2.

When the mixing ratio Y of the solvents is between Y1 and Y3 (Y1>Y>Y3), it is meant that the polyethylene glycol compound having one carboxyl group can be purified by extraction with industrially utilizable efficiency under more preferred conditions.

As to polyethylene glycol compounds having one carboxyl group of various molecular weights, effects of the purification by extraction were investigated. As representatives, explanation is performed below with reference to data for weight average molecular weights of 5,000 and 40,000.

First, the appropriate ranges of the mixing ratio Y of the solvents and the temperature T were investigated.

A polyethylene glycol compound having one carboxyl group was dissolved in a weakly alkaline aqueous solution. A mixed solution of the organic solvent I and the organic solvent II was added thereto and an extraction operation was performed twice. The organic layer was distilled off under a reduced pressure by an evaporator and mass measurement and HPLC measurement of the polyethylene glycol compound recovered were performed. Each mass of a polyethylene glycol compound having a carboxyl group and a polyethylene glycol compound having no carboxyl group was calculated from the ratio of peak areas of HPLC chromatogram and the mass. The extraction investigation was performed under conditions of various extraction temperatures and the mixing ratios of the solvents and Y1, Y2 and Y3 at the respective temperatures were calculated. Taking the mixing ratio Y of the solvents on the vertical axis and the extraction temperature T on the horizontal axis, Y1, Y2 and Y3 were plotted.

Figure 2:
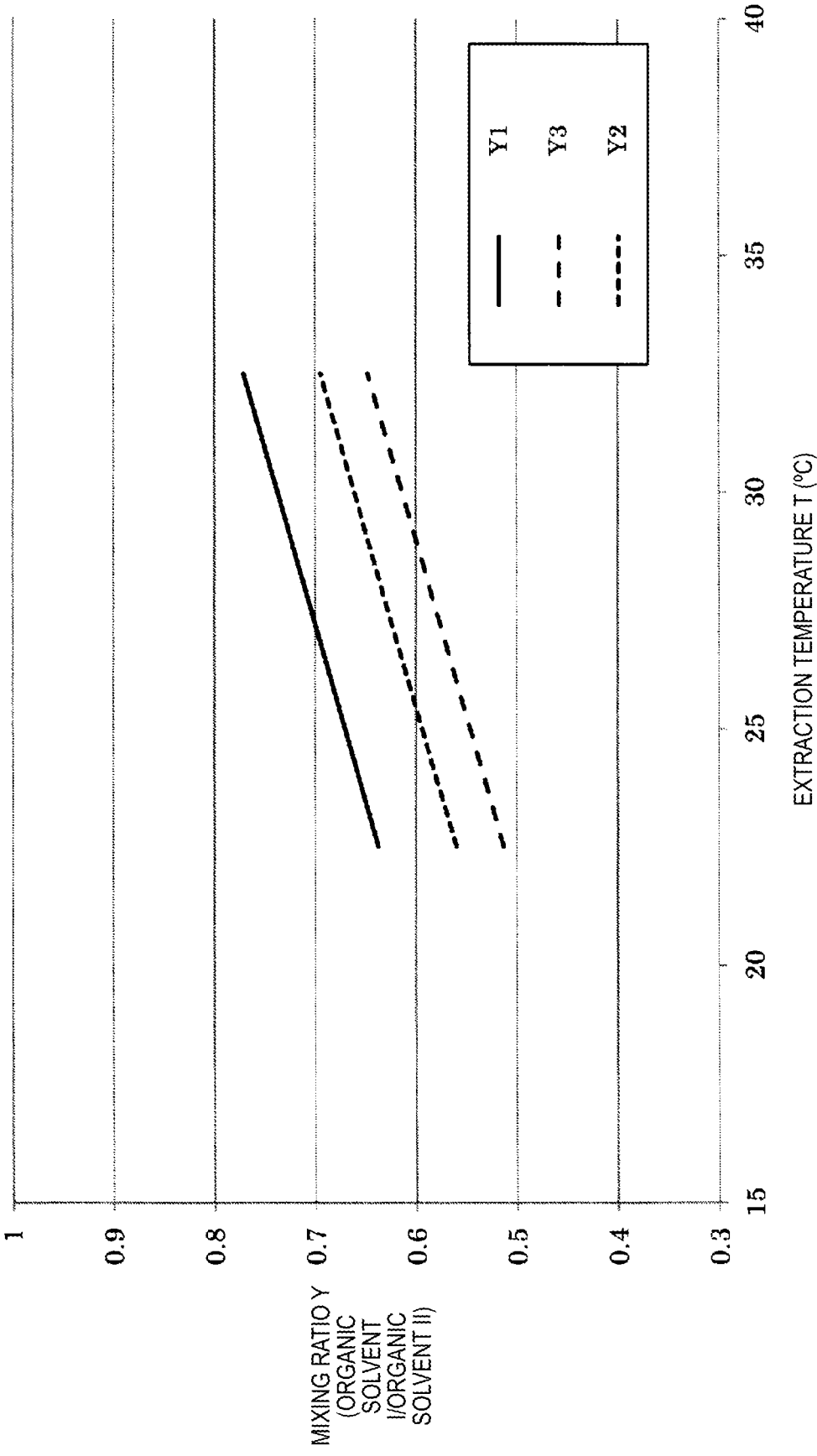
FIG. 2 is a graph showing a relationship between the mixing ratio of the solvents Y and the extraction temperature T in the case where a weight average molecular weight of the polyethylene glycol compound is 40,000.

As shown in FIGS. 1 and 2, in the case of the polyethylene glycol compounds having the weight average molecular weight M of 5,000 and 40,000, Y1, Y2 and Y3 were able to be expressed by formulae (3) and (4) as functions of the temperature T, respectively. In the case of M=5,000:

$$Y1=0.0135T+0.395, Y2=0.0135T+0.100, Y3=0.0135T+0.185 \quad (3)$$

In the case of M=40,000:

$$Y1=0.0135T+0.333, Y2=0.0135T+0.209, Y3=0.0135T+0.256 \quad (4)$$

From formulae (3) and (4), it could be seen that the slope of the graph of 0.0135 to temperature change was independent of the weight average molecular weight of the polyethylene glycol compound and was constant. In other words, as shown in FIG. 3, in the case where extraction purification is performed using a polyethylene glycol compound having a certain weight average molecular weight M, Y1, Y2 and Y3 are able to be expressed by formula (5) as functions of the temperature T, respectively and when respective intercepts are taken as A, B and C.

$$Y1=0.0135T+A, Y2=0.0135T+B, Y3=0.0135T+C \quad (5)$$

Figure 3:
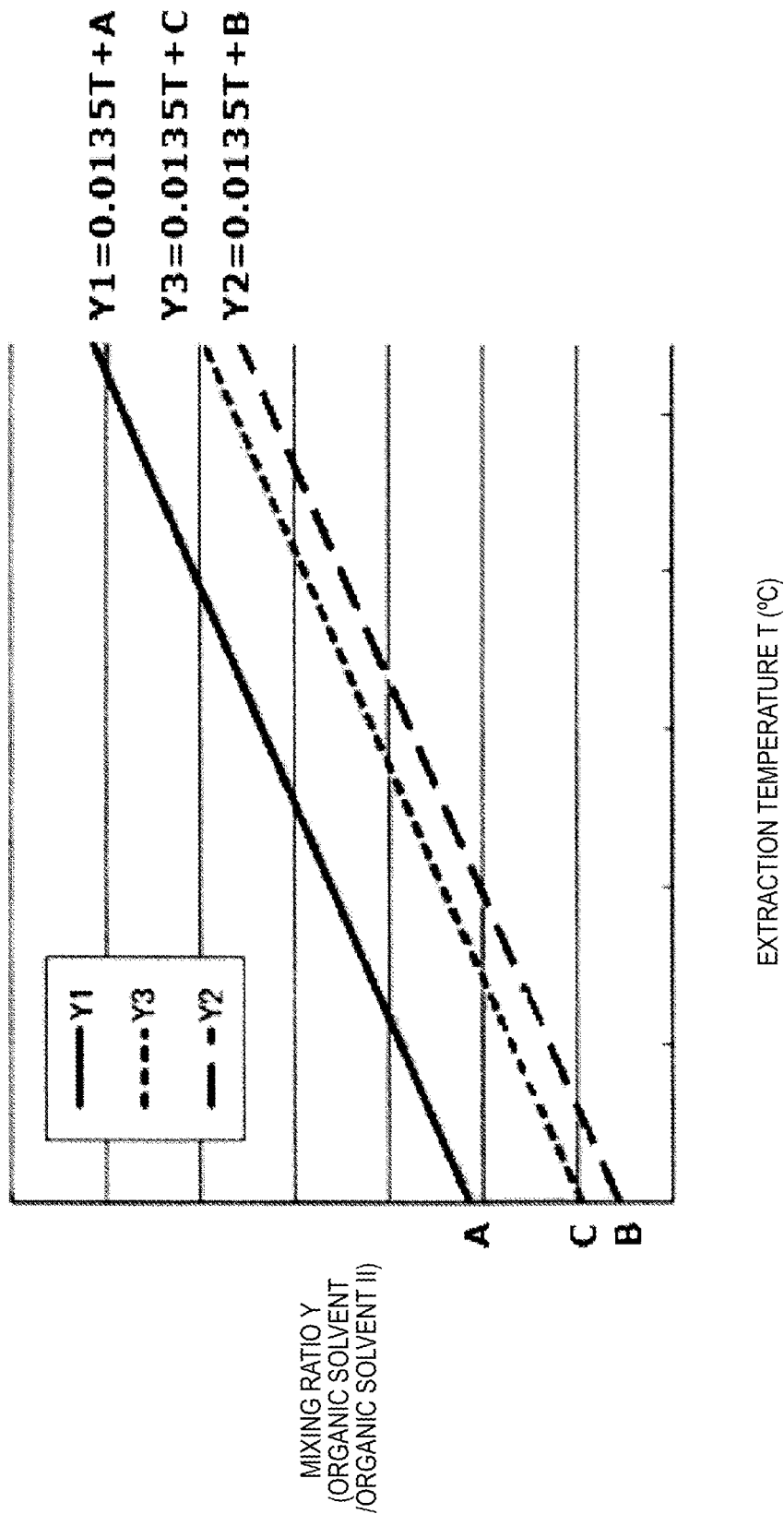
FIG. 3 is a graph showing a relationship between the mixing ratio of the solvents Y and the extraction temperature T of the polyethylene glycol compound at a certain weight average molecular weight M and is a graph showing a range in which the purification treatment is possible.

As shown in FIG. 3, the purification by extraction is possible when the mixing ratio Y falls within the range which satisfies $Y \leq 0.0135T+A$ and $Y \geq 0.0135T+B$ in FIG. 3, and summarizing two formulae it can be expressed as shown in formula (6).

$$B \leq Y-0.0135T \leq A \quad (6)$$

The range which satisfies $Y \leq 0.0135T+A$ and $Y \geq 0.0135T+C$ in FIG. 3 is preferred, and summarizing two formulae it can be expressed as shown in formula (7).

$$C \leq Y-0.0135T \leq A \quad (7)$$

Figure 4:
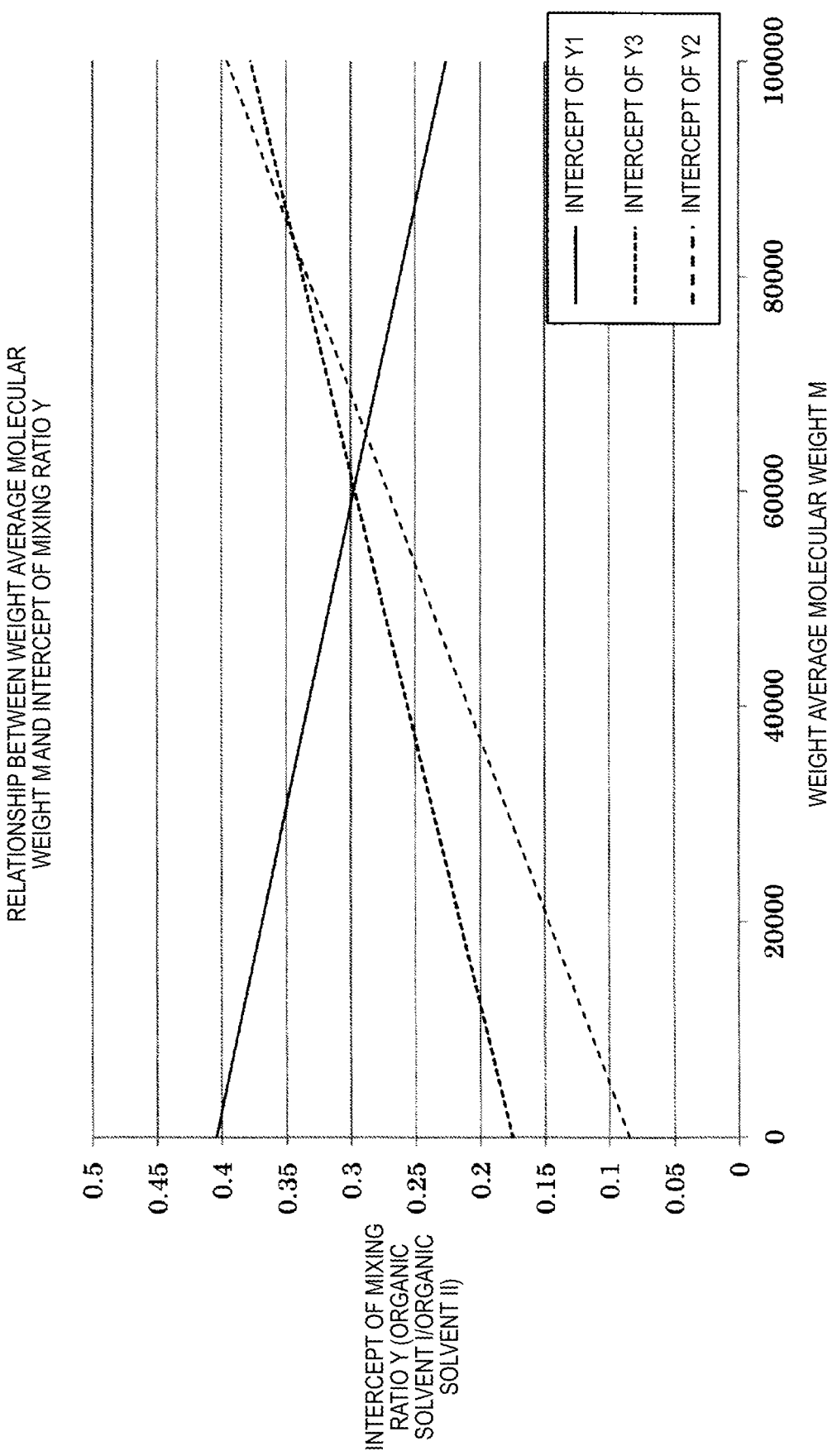
FIG. 4 is a graph showing a relationship between the weight average molecular weight M of the polyethylene glycol compound and the intercept of the mixing ratio of the solvents Y.

Next, as shown in FIG. 4, taking the intercept of Y on the vertical axis and the weight average molecular weight M on the horizontal axis, A, B and C obtained from formulae (3) and (4) were plotted respectively. From FIG. 4, when the respective intercepts A, B and C are regarded as functions of the weight average molecular weight M, they can be expressed as shown in formula (8).

$$A=-1.77 \times 10^{-6}M+0.404$$

$$B=3.11 \times 10^{-6}M+0.084$$

$$C=2.03 \times 10^{-6}M+0.175 \quad (8)$$

Summarizing the above, when the mixing ratio of the organic solvent I to the organic solvent II (organic solvent I/organic solvent II) is taken as Y, the temperature in the step (B) is taken as T (° C.), and the weight average molecular weight of the polyethylene glycol compound is taken as M, the range in which the purification due to the extraction is possible is $$3.11 \times 10^{-6}M+0.084 \leq Y-0.0135T \leq -1.77 \times 10^{-6}M+0.404$$
derived from formula (6) and formula (8), and is more preferably $$2.03 \times 10^{-6}M+0.175 \leq Y-0.0135T \leq -1.77 \times 10^{-6}M+0.404$$
derived from formula (7) and formula (8).

When the intercepts A and B coincide with each other, the region where the extraction purification is possible in FIG. 4 is not present. The weight average molecular weight M at this time is M=65573 due to the fact of A=B. That is, the upper limit of the weight average molecular weight at which the extraction purification is possible comes to 65573. The time when the intercepts A and C coincide with each other is more preferred and at this time M=60263 due to the fact of B=C. That is, the upper limit of the weight average molecular weight at which the more preferred extraction purification is possible comes to 60263.

On the other hand, according to Patent Literature 6, the upper limit of the weight average molecular weight at which the extraction purification is possible in the polyethylene glycol compound having an amino group is 104167. The fact that the upper limit of the weight average molecular weight at which the extraction purification is possible in the polyethylene glycol compound having a carboxyl group is lower than that of an amino group indicates that since the carboxyl group is less hydrophilic in comparison with the amino group, the difference in the solubilities in the mixed solvent and the aqueous solution is small between the polyethylene glycol compound having a carboxyl group and the polyethylene glycol compound having no carboxyl group, so that the region of the weight average molecular weight thereof where the extraction purification can be selectively performed is narrower.

Example 1

In the example, the weight average molecular weight M is 5,000, the extraction temperature T is 27.5° C., and Y is 0.53.

Into a 200 mL four-necked flask equipped with a mechanically stirring device, a thermometer and a nitrogen inlet tube was put 5 g of α-methoxy-ω-carboxymethyl-polyethylene glycol represented by formula [1] (weight average molecular weight: 5,000, carboxylic acid purity: 79.2%) and dissolved in 50 g of a 100 mM borate buffer solution (pH 9). A mixed solvent of 16 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 16 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved.

After adjusting pH to 2 by adding 6N hydrochloric acid to the aqueous solution, 25 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.9 g, carboxylic acid purity: 99.0%, carboxylic acid yield: 98.5%).

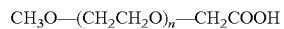
$$CH_3O—(CH_2CH_2O)_n—CH_2COOH \quad [1]$$

Example 1-1

In Example 1, the mixing ratio Y was variously changed at the extraction temperature of 27.5° C., and the mixing ratio (Y1) at which the weight of the α-methoxy-ω-carboxymethyl-polyethylene glycol in the mass of the concentrate was 5%, the mixing ratio (Y2) at which the resulting condensate was the minimum and the mixing ratio (Y3) at which the weight of the compound was 20% were investigated. As a result, Y1 was 0.751, Y2 was 0.490 and Y3 was 0.565.

Example 1-2

In Example 1, the mixing ratio Y was variously changed at the extraction temperature of 32.5° C., and the mixing ratio (Y1), (Y2) and (Y3) were investigated. As a result, Y1 was 0.842, Y2 was 0.530 and Y3 was 0.620.

Example 1-3

In Example 1, the mixing ratio Y was variously changed at the extraction temperature of 22.5° C., and the mixing ratio (Y1), (Y2) and (Y3) were investigated. As a result, Y1 was 0.707, Y2 was 0.395 and Y3 was 0.485.

FIG. 1 is a figure in which the results of Examples 1 to 3 are plotted.

Example 2

In the example, the weight average molecular weight M is 40,000, the extraction temperature T is 27.5° C., and Y is 0.63.

Into a 200 mL four-necked flask equipped with a mechanically stirring device, a thermometer and a nitrogen inlet tube was put 5 g of α-methoxy-ω-carboxymethyl-polyethylene glycol represented by formula [1] (weight average molecular weight: 40,000, carboxylic acid purity: 80.5%) and dissolved in 50 g of a 100 mM borate buffer solution (pH 9). A mixed solvent of 19 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 19 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. After adjusting pH to 2 by adding 6N hydrochloric acid to the aqueous solution, 25 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.8 g, carboxylic acid purity: 99.2%, carboxylic acid yield: 93.7%).

Example 2-1

In Example 1, the mixing ratio Y was variously changed at the extraction temperature of 27.5° C., and the mixing ratio (Y1) at which the weight of the α-methoxy-ω-carboxymethyl-polyethylene glycol in the mass of the concentrate was 5%, the mixing ratio (Y2) at which the resulting condensate was the minimum and the mixing ratio (Y3) at which the weight of the compound was 20% were investigated. As a result, Y1 was 0.704, Y2 was 0.580 and Y3 was 0.627.

Example 2-2

In Example 1, the mixing ratio Y was variously changed at the extraction temperature of 32.5° C., and the mixing ratio (Y1), (Y2) and (Y3) were investigated. As a result, Y1 was 0.771, Y2 was 0.648 and Y3 was 0.695.

Example 2-3

In Example 1, the mixing ratio Y was variously changed at the extraction temperature of 22.5° C., and the mixing ratio (Y1), (Y2) and (Y3) were investigated. As a result, Y1 was 0.637, Y2 was 0.513 and Y3 was 0.561.

FIG. 2 is a figure in which the results of Examples 2-1 to 2-3 are plotted.

Example 3

In the example, the weight average molecular weight M is 5,000, the extraction temperature T is 27.5° C., and Y is 0.67.

Into a 200 mL four-necked flask equipped with a mechanically stirring device, a thermometer and a nitrogen inlet tube was put 5 g of α-methoxy-ω-2-carboxyethyl-polyethylene glycol represented by formula [2] (weight average molecular weight: 5,000, carboxylic acid purity: 78.1%) and dissolved in 50 g of a 50 mM borate buffer solution (pH 9). A mixed solvent of 20 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 20 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. After adjusting pH to 2 by adding 6N hydrochloric acid to the aqueous solution, 25 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.6 g, carboxylic acid purity: 99.0%, carboxylic acid yield: 91.3%).

$$CH_3O—(CH_2CH_2O)_n—CH_2CH_2COOH \qquad [2]$$

Example 4

In the example, the weight average molecular weight M is 20,000, the extraction temperature T is 27.5° C., and Y is 0.67.

Into a 200 mL three-necked flask equipped with a mechanically stirring device, a thermometer and a nitrogen inlet tube were put 5 g of α-methoxy-ω-5-carboxypentyl-polyethylene glycol represented by formula [3] (weight average molecular weight: 20,000, carboxylic acid purity: 79.5%) and 50 g of water, and the mixture was stirred under a nitrogen atmosphere at room temperature to be dissolved. To the solution was added a 1M sodium carbonate aqueous solution to adjust pH to 10. A mixed solvent of 18 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 20 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. After adjusting pH to 2 by adding 6N hydrochloric acid to the aqueous solution, 25 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.5 g, carboxylic acid purity: 99.3%, carboxylic acid yield: 86.8%).

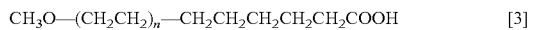

CH$_3$O—(CH$_2$CH$_2$)$_n$—CH$_2$CH$_2$CH$_2$CH$_2$CH$_2$COOH  [3]

Example 5

In the example, the weight average molecular weight M is 10,000, the extraction temperature T is 27.5° C., and Y is 0.50.

Into a 200 mL four-necked flask equipped with a mechanically stirring device, a thermometer and a nitrogen inlet tube was put 5 g of α-2-cyanoethoxy-ω-5-carboxypentyl-polyethylene glycol represented by formula [4] (weight average molecular weight: 10,000, carboxylic acid purity: 81.7%) and dissolved in 50 g of a 100 mM borate buffer solution (pH 9). A mixed solvent of 15 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 15 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. After adjusting pH to 2 by adding 6N hydrochloric acid to the aqueous solution, 25 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.7 g, carboxylic acid purity: 99.1%, carboxylic acid yield: 89.8%).

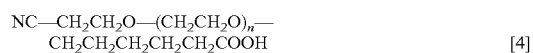

NC—CH$_2$CH$_2$O—(CH$_2$CH$_2$O)$_n$—CH$_2$CH$_2$CH$_2$CH$_2$CH$_2$COOH  [4]

Example 6

In the example, the weight average molecular weight M is 40,000, the extraction temperature T is 27.5° C., and Y is 0.65.

Into a 200 mL four-necked flask equipped with a mechanically stirring device, a thermometer and a nitrogen inlet tube was put 10 g of branched polyethylene glycol represented by formula [5] (weight average molecular weight: 40,000, carboxylic acid purity: 81.3%) and dissolved in 100 g of a 100 mM borate buffer solution (pH 9). A mixed solvent of 39 g of toluene and 60 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 39 g of toluene and 60 g of chloroform newly prepared was added and the extraction operation was performed in the same manner. After stirring and layer separation, the organic layer was removed and 25 g of sodium chloride was added to the remaining aqueous layer, the mixture was stirred at room temperature to be dissolved. After adjusting pH to 3 by adding 6N hydrochloric acid to the aqueous solution, 100 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 100 g of ethyl acetate, dehydration was performed with 3.0 g of magnesium sulfate, followed by filtration. To the filtrate was added 50 g of hexane to deposit crystals. The slurry was stirred for 30 minutes, filtered, and the residue was washed with 50 g of hexane and then drying was performed in vacuo to obtain a purified product (7.1 g, carboxylic acid purity: 99.3%, carboxylic acid yield: 90.4%).

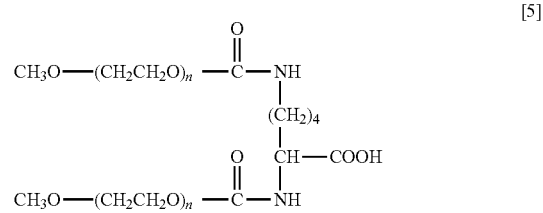

Comparative Example 1

Next, purification was performed by an ion-exchange column in the same manner as in the example of Patent Literature 4 and the results were compared.

In a column having a diameter of 6 cm was filled about 850 ml of DEAE Sepharose FF (manufactured by GE Healthcare) so as to have a height of 30 cm using ion-exchanged water as a developing solution. In 4.4 L of ion-exchanged water was dissolved 20 g of the branched polyethylene glycol represented by formula [5], the solution was charged into the column and the eluate was recovered while confirming the fraction containing the purified [5] by TLC. To the eluate recovered was added sodium chloride and then chloroform, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (3.8 g, carboxylic acid purity: 99.3%, carboxylic acid yield: 22.9%).

Comparative Example 2

Next, purification was performed by an inorganic adsorbent in the same manner as in the example of Patent Literature 5 and the results were compared.

Into a 1 L four-necked flask equipped with a mechanically stirring device, a Dimroth condenser, a thermometer and a nitrogen inlet tube was put 30 g of the branched polyethylene glycol represented by formula [5] and 450 g of toluene, and the mixture was stirred under a nitrogen atmosphere at 55° C. to be dissolved. To the solution was added 120 g of KYOWAAD 200B (Kyowa Chemical Industry Co., Ltd.), the mixture was stirred at 50° C. for one hour to perform adsorption operation, followed by filtration. Then, the filter cake was washed with 300 g of toluene previously heated at 50° C. Then, ethanol was added to the filter cake, and the mixture was heated at 50° C. with stirring and filtered to recover a filtrate. Further, the filter cake was washed with 300 g of ethanol heated at 50° C., and the filtrate was recovered. The filtrate was concentrated using an evaporator and after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product (12.3 g, carboxylic acid purity: 99.4%, carboxylic acid yield: 50.0%).

The results of Example 6 and Comparative Examples 1 and 2 are shown in Table 1 below.

TABLE 1

|  | Example 6 | Comparative Example 1 | Comparative Example 2 |
| --- | --- | --- | --- |
| Carboxylic acid purity before purification (%) |  | 81.3 |  |
| Carboxylic acid purity after purification (%) | 99.3 | 99.3 | 99.4 |
| Carboxylic acid yield (%) | 90.4 | 22.9 | 50.0 |

As shown in Table 1, the carboxylic acid purity of the polyethylene glycol compound having one carboxyl group obtained by the purification method of the invention is equal to that of the purified product by the ion-exchange resin in Comparative Example 1 and that of the purified product by the inorganic adsorbent in Comparative Example 2, and at to the carboxylic acid yield, a remarkably high result was obtained.

Figure 5:
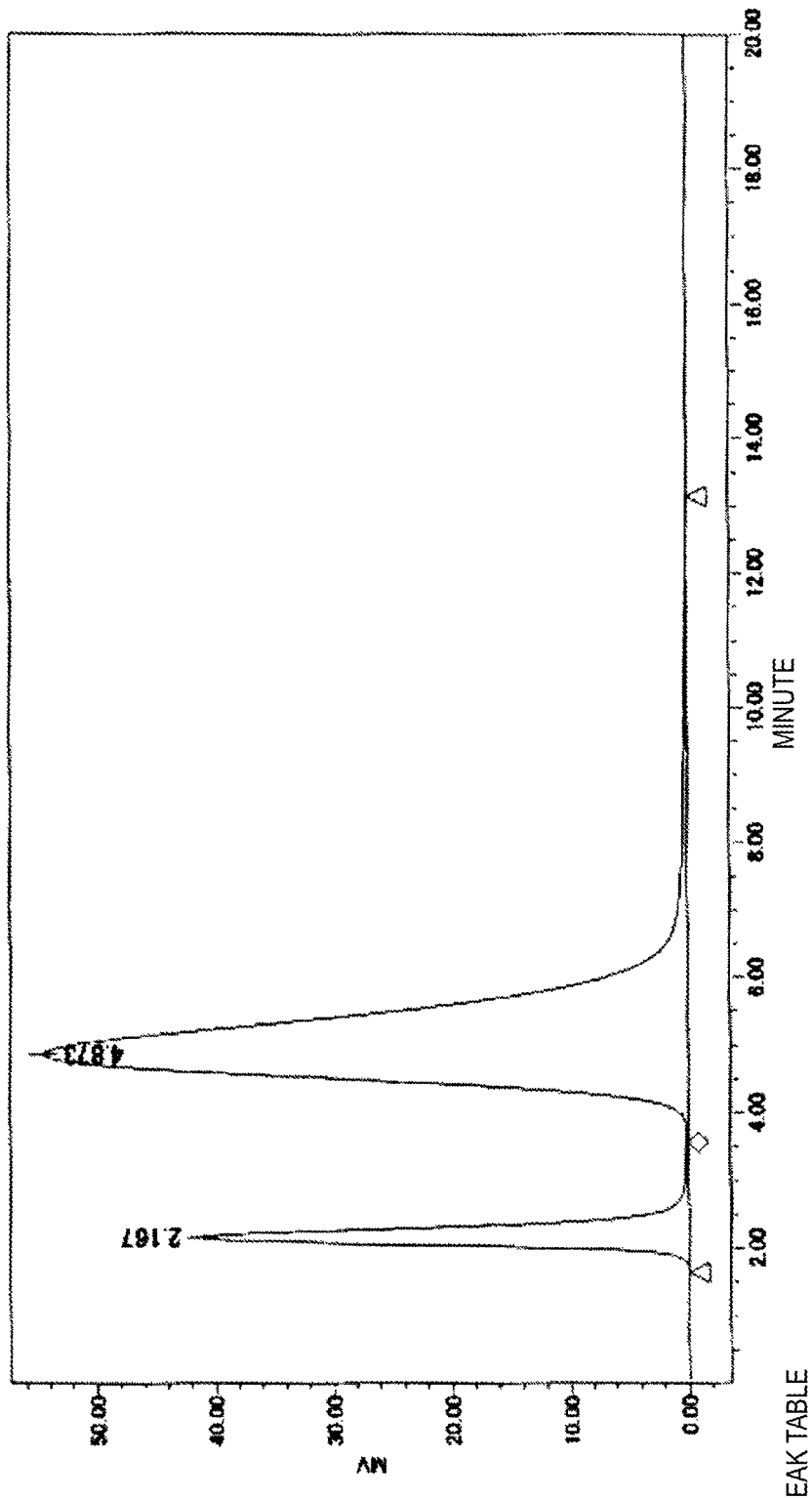
FIG. 5 shows an HPLC chromatogram of the raw material used in the extraction purification in Example 6.
Figure 6:
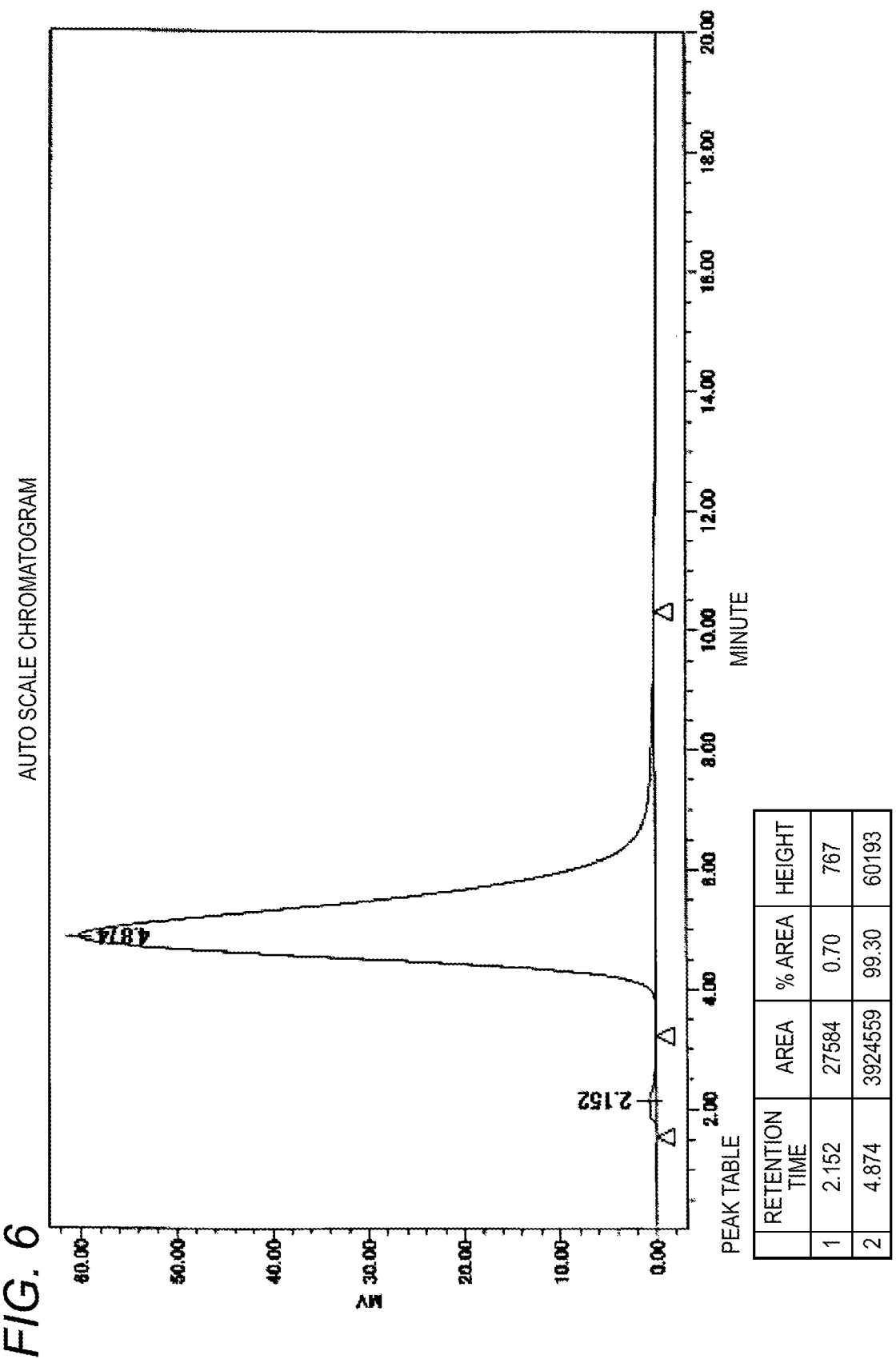
FIG. 6 shows an HPLC chromatogram of the purified product obtained in Example 6.

In addition, FIG. 5 shows an HPLC chromatogram of the raw material used for extraction purification in Example 5 and FIG. 6 shows an HPLC chromatogram of the purified product obtained in Example 5.

Next, a comparative investigation was made whether it is possible to perform purification of the polyethylene glycol compound having one carboxyl group in the range in which the purification of the polyethylene glycol compound having one amino group is possible as described in Patent Literature 6.

Comparative Example 3

Into a 100 mL three-necked flask equipped with a mechanically stirring device, a thermometer and a nitrogen inlet tube were put 5 g of α-methoxy-ω-5-carboxypentyl-polyethylene glycol represented by formula [3] (weight average molecular weight: 20,000, carboxylic acid purity: 79.5%) and 50 g of water, and the mixture was stirred under a nitrogen atmosphere at room temperature to be dissolved. To the aqueous solution was added 6N hydrochloric acid to adjust pH to 2. A mixed solvent of 18 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 18 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. To the solution was added 25 g of chloroform, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a final product. The carboxylic acid purity of the final product obtained was 64.3%.

As described above, the purification could not be performed because the carboxyl group was not ionized under the acidic conditions.

Next, in Comparative Example 4-1 and Comparative Example 4-2, comparative investigations were made whether it is possible to perform purification of the polyethylene glycol compound having one carboxyl group at the ratio of mixed solvent and the temperature in which the purification of the polyethylene glycol compound having one amino group is possible as described in Patent Literature 6.

Comparative Example 4-1

In the example, the weight average molecular weight M is 80,000, the extraction temperature T is 27.5° C., and Y is 0.67.

Into a 200 mL four-necked flask equipped with a mechanically stirring device, a Dimroth condenser, a thermometer and a nitrogen inlet tube were put 5 g of the branched polyethylene glycol derivative represented by formula [6] (weight average molecular weight: 80,000, amine purity: 78.3%) and 50 g of water, and the mixture was stirred under a nitrogen atmosphere at room temperature to be dissolved. To the aqueous solution was added IN hydrochloric acid to adjust pH to 2. A mixed solvent of 20 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 20 g of toluene and 30 g of chloroform newly prepared was added and the extraction operation was performed in the same manner. After stirring and layer separation, the organic layer was removed and 10 g of sodium chloride was added to the remaining aqueous layer, the mixture was stirred at room temperature to be dissolved. To the solution was added IN NaOH aqueous solution to adjust pH to 12. The solution was slowly stirred and heated to 50° C., 37.5 g of toluene was added thereto, and the mixture was stirred at 50° C. for 30 minutes. After stirring was stopped, the mixture was allowed to stand at the same temperature for 30 minutes to cause layer separation. The lower organic layer was recovered in an eggplant-shaped flask. Extraction was performed again by adding 37.5 g of toluene and the organic layer was recovered in an eggplant-shaped flask.

sented by formula [7] (weight average molecular weight: 80,000, carboxylic acid purity: 77.6%) and dissolved in 50 g of a 100 mM borate buffer solution (pH 9). A mixed solvent of 20 g of toluene and 30 g of chloroform was added thereto and the mixture was stirred at 27.5° C. for 30 minutes. After stirring was stopped, the mixture was allowed to stand at the same temperature for 30 minutes to cause layer separation. The lower organic layer separated was removed, and a mixed solvent of 20 g of toluene and 30 g of chloroform newly prepared was added and the extraction operation was performed in the same manner. After stirring and layer separation, the organic layer was removed and 12.5 g of sodium chloride was added to the remaining aqueous layer, the mixture was stirred at room temperature to be dissolved. After adjusting pH to 2 by adding 6N hydrochloric acid to the aqueous solution, 50 g of chloroform was added thereto, and the mixture was stirred at room temperature for 30 minutes. After stirring was stopped, the mixture was allowed to stand for 30 minutes to cause layer separation. The lower organic layer was recovered in an eggplant-shaped flask. The organic layer was concentrated by an evaporator at 40° C. and, after dilution by adding 50 g of ethyl acetate, dehydration was performed with 1.5 g of magnesium sulfate, followed by filtration. To the filtrate was added 25 g of hexane to deposit crystals. The slurry was stirred for 30 minutes, filtered, and the residue was washed with 25 g of hexane and then drying was performed in vacuo to obtain a purified product. The carboxylic acid purity of the final product obtained was 77.8%.

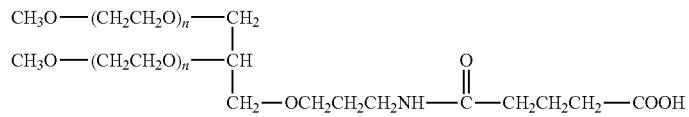

[7]

The organic layer was concentrated by an evaporator at 50° C. and, and dehydration was performed with 1.5 g of magnesium sulfate, followed by filtration. The filter cake was washed with 10 g of toluene and the washing liquid was put together with the filtrate. After the solution was cooled to room temperature with stirring using a magnetic stirrer, 25 g of hexane was added thereto to deposit crystals. The slurry was stirred for 30 minutes and filtrated and, after the residue was washed with 40 g of hexane, drying was performed in vacuo to obtain a purified product (3.7 g, amine purity: 97.4%, amine yield: 92.1%).

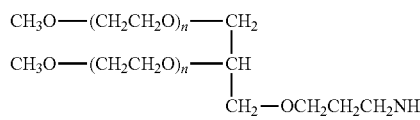

[6]

Comparative Example 4-2

In the example, the weight average molecular weight M is 80,000, the extraction temperature T is 27.5° C., and Y is 0.67.

Into a 100 mL four-necked flask equipped with a mechanically stirring device, a thermometer and a nitrogen inlet tube was put 5 of branched polyethylene glycol repre- As shown in Comparative Examples 4-1 and 4-2, the purification of the polyethylene glycol compound having one carboxyl group could not be performed at the ratio of mixed solvent and the temperature in which the purification of the polyethylene glycol compound having one amino group was possible.

According to the example, it is indicated that since the carboxyl group is less hydrophilic in comparison with the amino group, the difference in the solubilities in the mixed solvent and the aqueous solution is small between the polyethylene glycol compound having a carboxyl group and the polyethylene glycol compound having no carboxyl group, so that the region of the weight average molecular weight thereof where the extraction purification can be selectively performed is narrower.

From the above, the invention is a useful purification method capable of industrially producing a polyethylene glycol compound having one carboxyl group with high purity and good yield.

While the invention has been described in detail and with reference to specific embodiments thereof, it will be apparent to those skilled in the art that various changes and modifications can be made therein without departing from the spirit and scope of the invention.

This application is based on Japanese patent application filed on Mar. 30, 2017 (Japanese Patent Application No. 2017-066695), and the whole contents thereof are incorporated herein by reference. Also, all the references cited herein are incorporated as a whole.

The invention claimed is:

1. A purification method of a polyethylene glycol compound having one carboxyl group in which a total average molar number of ethylene oxide units added in a molecule of the polyethylene glycol compound is from 20 to 1490, the method comprising the following step (A), step (B) and step (C):
   (A) a step of preparing an aqueous solution of the polyethylene glycol compound, which is a weakly alkaline aqueous solution having a pH of 8 to 11;
   (B) an extraction step in which the aqueous solution obtained in the step (A) and a mixed organic solvent are mixed at a temperature of 15° C. or more and 50° C. or less and the mixture is separated into an organic layer and an aqueous layer, wherein in the mixed organic solvent, a ratio of an organic solvent I is from 25 to 60% by mass, a ratio of an organic solvent II is from 75 to 40% by mass, the organic solvent I is a hydrocarbon solvent selected from the group consisting of toluene, xylene, methyl acetate, ethyl acetate and butyl acetate, the organic solvent II is a halogenated hydrocarbon solvent selected from the group consisting of methylene chloride and chloroform, and a mixing ratio Y of the organic solvent I to the organic solvent II (organic solvent I/organic solvent II), a temperature T (° C.) at the time of the mixing and a weight average molecular weight M of the polyethylene glycol compound satisfy a relationship of formula (1):

$$3.11\times10^{-6}M+0.084\leq Y-0.0135T\leq-1.77\times10^{-6}M+0.404 \quad (1);$$

and
   (C) a step of recovering the polyethylene glycol compound from the aqueous layer.

2. The method as claimed in claim 1, wherein in the step (B), the mixing ratio Y of the organic solvent I to the organic solvent II (organic solvent I/organic solvent II), the temperature T (° C.) at the time of the mixing and the weight average molecular weight M of the polyethylene glycol compound satisfy a relationship of formula (2):

$$2.03\times10^{-6}M+0.175\leq Y-0.0135T\leq-1.77\times10^{-6}M+0.404 \quad (2).$$

3. The method as claimed in claim 1, wherein the extraction step (B) is performed a plurality of times for the aqueous layer separated in the step (B).

4. The method as claimed in claim 1, wherein in the step (A), the weakly alkaline aqueous solution comprises a buffer.

5. The method as claimed in claim 4, wherein in the step (A), the buffer is one or more salts selected from the group consisting of an organic salt and an inorganic salt of one or more elements selected from the group consisting of sodium, potassium, lithium and ammonium.

6. The method as claimed in claim 1, wherein in the step (B), the organic solvent I comprises toluene.

7. The method as claimed in claim 1, wherein in the step (B), the organic solvent II comprises chloroform.

8. The method as claimed in claim 2, wherein the extraction step (B) is performed a plurality of times for the aqueous layer separated in the step (B).

9. The method as claimed in claim 2, wherein in the step (A), the weakly alkaline aqueous solution comprises a buffer.

10. The method as claimed in claim 3, wherein in the step (A), the weakly alkaline aqueous solution comprises a buffer.

11. The method as claimed in claim 8, wherein in the step (A), the weakly alkaline aqueous solution comprises a buffer.

12. The method as claimed in claim 9, wherein in the step (A), the buffer is one or more salts selected from the group consisting of an organic salt and an inorganic salt of one or more elements selected from the group consisting of sodium, potassium, lithium and ammonium.

13. The method as claimed in claim 10, wherein in the step (A), the buffer is one or more salts selected from the group consisting of an organic salt and an inorganic salt of one or more elements selected from the group consisting of sodium, potassium, lithium and ammonium.

14. The method as claimed in claim 11, wherein in the step (A), the buffer is one or more salts selected from the group consisting of an organic salt and an inorganic salt of one or more elements selected from the group consisting of sodium, potassium, lithium and ammonium.

15. The method as claimed in claim 2, wherein in the step (B), the organic solvent I comprises toluene.

16. The method as claimed in claim 3, wherein in the step (B), the organic solvent I comprises toluene.

17. The method as claimed in claim 4, wherein in the step (B), the organic solvent I comprises toluene.

18. The method as claimed in claim 2, wherein in the step (B), the organic solvent II comprises chloroform.

19. The method as claimed in claim 3, wherein in the step (B), the organic solvent II comprises chloroform.

20. The method as claimed in claim 4, wherein in the step (B), the organic solvent II comprises chloroform.

* * * * *